No. 877,675.
PATENTED JAN. 28, 1908.
E. A. SMOTHERS.
DOUGH RAISER.
APPLICATION FILED MAY 13, 1907.
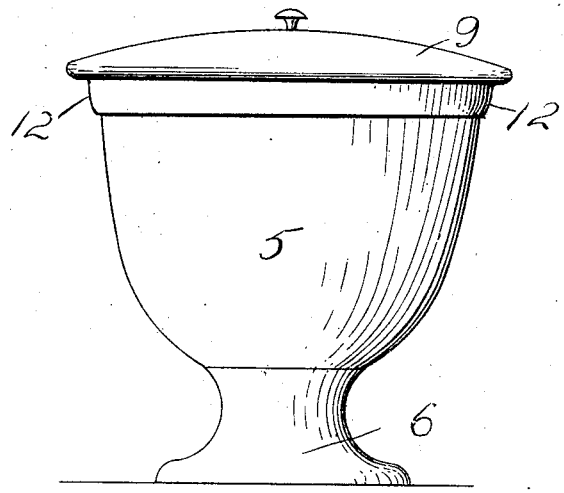
Fig. 1.
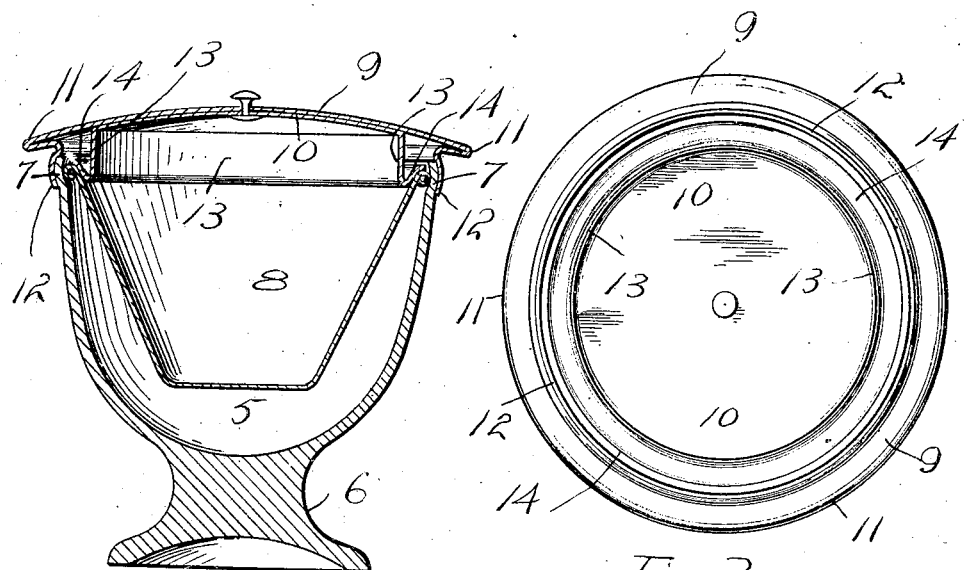
Fig. 2.
Fig. 3.
Witnesses
J. C. Simpson
F. G. Smith
Inventor
Elizabeth A. Smothers.
By Chandler & Chandler
Attorneys

UNITED STATES PATENT OFFICE.

ELIZABETH A. SMOTHERS, OF MILLS, NEBRASKA.

DOUGH-RAISER.

No. 877,675.  Specification of Letters Patent.  Patented Jan. 28, 1908.

Application filed May 13, 1907. Serial No. 373,398.

*To all whom it may concern:*

Be it known that I, ELIZABETH A. SMOTHERS, a citizen of the United States, residing at Mills, in the county of Keyapaha, State of Nebraska, have invented certain new and useful Improvements in Dough-Raisers; and I do hereby declare the following to be a full, clear, and exact description of the invention, such as will enable others skilled in the art to which it appertains to make and use the same.

This invention relates to dough raisers and has for its object to provide a simple device of this character of that class in which hot water is employed as a heating agent.

Broadly stated the invention resides in the provision of a water containing bowl and a dough containing bowl and the novelty in my device resides principally in the specific construction of the lid for the two bowls, the lid being a double one and including two concentric flanges which cooperate with the upper edges of the water and dough receiving bowls to insure against the escape of steam from the water containing bowl.

In the accompanying drawings, Figure 1 is a side elevation of the bread raiser, Fig. 2 is a vertical sectional view taken centrally therethrough, and, Fig. 3 is a plan view of the under side of the lid for the device.

As shown in the drawings the device comprises a water containing bowl 5 having a base 6 and provided at its upper end with an annular bulged portion 7. A dough receiving bowl 8 is received within the bowl 5 but only contacts therewith at the upper edge of the bowl 5 so as to provide space for hot water contained in the bowl 5, it being understood that this water entirely surrounds the bowl 8 with the exception of course of its top. The upper edge of the bowl 8 as stated above rests in the annular concavity formed by the bulged portion 7 in the bowl 5.

The lid for the bread raising device is practically a double one, the outer lid being indicated by the numeral 9 and the inner one by the numeral 10. The lids are of course secured together. The outer edge portion of the lid 9 is crimped upon itself as indicated at 11 in the manner usual in such lids and is then bent downwardly to form a depending annular flange 12 which is slightly bulged as clearly shown in Fig. 2 of the drawings so as to fit snugly over the bulged upper edge portion of the vessel 5. The outer edge portion of the under lid 10 is bent to form a depending annular flange 13 which is concentric to the flange 12 and which has its lower edge portion bent upwardly at an acute angle to form a flange 14 which snugly engages the inner upper edge of the bowl 8 when the lid is in place within the two bowls. Not only does this flange 14 prevent escape of steam from the flange 5 into the bowl 8 but any steam which should escape between the upper edge of the bowl 8 and the corresponding portion of the bowl 5, and condenses, the water condensation will flow into a trough formed between the flanges 13 and 14 and hence will not leak between the flange 14 and the upper edge of the bowl 8.

What is claimed is—

A dough raiser comprising a water containing bowl, a dough containing bowl received within the water containing bowl and contacting at its upper edge with the corresponding portion of the water receiving bowl whereby the dough receiving bowl will be held in spaced relation with respect to the water receiving bowl, and a lid for the dough raiser, said lid being double, the upper edge portion of the water receiving bowl being outwardly bulged, a depending bulged flange formed at the outer edge of the upper lid member, a depending flange formed at the outer edge of the under lid member, said flange being bent outwardly at an acute angle to form a flange which fits snugly against the inner upper edge of the dough receiving bowl, the two last mentioned flanges forming substantially a trough.

In testimony whereof, I affix my signature, in presence of two witnesses.

ELIZABETH A. SMOTHERS.

Witnesses:
G. W. SNODGRASS,
IRA KNAPP.